United States Patent
Fleck et al.

(10) Patent No.: US 6,620,541 B2
(45) Date of Patent: Sep. 16, 2003

(54) HIGH-TEMPERATURE FUEL CELL

(75) Inventors: Robert Fleck, Adelsdorf (DE); Wolfram Kaiser, Bonndorf (DE)

(73) Assignee: Siemens Aktiengesellschaft, Munich (DE)

(*) Notice: Subject to any disclaimer, the term of this patent is extended or adjusted under 35 U.S.C. 154(b) by 104 days.

(21) Appl. No.: 09/963,958

(22) Filed: Sep. 26, 2001

(65) Prior Publication Data

US 2002/0094465 A1 Jul. 18, 2002

Related U.S. Application Data

(63) Continuation of application No. PCT/DE00/00719, filed on Mar. 8, 2000.

(30) Foreign Application Priority Data

Mar. 26, 1999 (DE) .......................... 199 13 957

(51) Int. Cl.[7] .......................... H01M 8/02; H01M 8/10; H01M 2/14; H01M 2/16
(52) U.S. Cl. .......................... 429/34; 429/30; 429/38; 429/44
(58) Field of Search .......................... 429/34, 38, 41, 429/44, 30, 31

(56) References Cited

U.S. PATENT DOCUMENTS

| | | | | |
|---|---|---|---|---|
| 4,950,563 A | * | 8/1990 | Stewart, Jr. et al. | 429/34 |
| 5,942,349 A | * | 8/1999 | Badwal et al. | 429/34 |
| 6,054,231 A | * | 4/2000 | Virkar et al. | 429/34 |
| 6,280,868 B1 | * | 8/2001 | Badwal et al. | 429/34 |
| 6,291,094 B1 | * | 9/2001 | Yoshimura et al. | 429/34 |
| 6,326,096 B1 | * | 12/2001 | Virkar et al. | 429/30 |

FOREIGN PATENT DOCUMENTS

| | | |
|---|---|---|
| DE | 43 40 153 C1 | 3/1995 |
| DE | 195 47 699 A1 | 7/1997 |
| WO | WO 97/35349 | 9/1997 |

OTHER PUBLICATIONS

A.J. Appleby et al.: "Fuel Cell Handbook", 1989, pp. 440–454; (No Month).

* cited by examiner

Primary Examiner—Patrick Ryan
Assistant Examiner—Tracy Dove
(74) Attorney, Agent, or Firm—Laurence A. Greenberg; Werner H. Stemer; Gregory L. Mayback

(57) ABSTRACT

During operation of a high-temperature fuel cell the problem of corrosion of the interconnector on the anode side arises. Accordingly, this problem is substantially prevented by use of at least two metallic functional layers that are applied one above the other on the interconnector. A lower functional layer contains copper and an upper functional layer contains nickel. Functional layers of this type construct a potential threshold for oxygen ions toward the interconnector.

10 Claims, 1 Drawing Sheet

HIGH-TEMPERATURE FUEL CELL

CROSS-REFERENCE TO RELATED APPLICATION

This application is a continuation of copending International Application No. PCT/DE00/00719, filed Mar. 8, 2000, which designated the United States.

BACKGROUND OF THE INVENTION

FIELD OF THE INVNETION

The invention relates to a high-temperature fuel cell, in which an electrical conductor electrically connects an interconnector to the anode of an electrolyte/electrode unit.

It is known that when water is electrolyzed the electrical current breaks down the water molecules to hydrogen ($H_2$) and oxygen ($O_2$) A fuel cell reverses this procedure. Electrochemical combination of hydrogen ($H_2$) and oxygen ($O_2$) to give water is a very effective generator of electric current. This occurs without any emission of pollutants or carbon dioxide if the fuel gas used is pure hydrogen ($H_2$). Even with an industrial fuel gas, such as natural gas or coal gas, and with air (which may also have been enriched with oxygen ($O_2$)) instead of pure oxygen ($O_2$), a fuel cell produces markedly lower levels of pollutants and less carbon dioxide than other energy generators in which the energy is introduced from different sources. The fuel cell principle has been implemented industrially in various ways, and indeed with various types of electrolyte and with operating temperatures of from 80° C. to 1,000° C.

Depending on their operating temperature, fuel cells are divided into low, medium, and high-temperature fuel cells, and these in turn have a variety of technical configurations.

In the case of a high-temperature fuel cell stack composed of a large number of high-temperature fuel cells, there is an upper interconnector, which covers the high-temperature fuel cell stack, and under this plate there are, in order, at least one contact layer, an electrolyte/electrode unit, a further contact layer, a further interconnector, etc.

The electrolyte/electrode unit here contains two electrodes—an anode and a cathode—and a solid electrolyte configured as a membrane disposed between the anode and the cathode. Each electrolyte/electrode unit here situated between two adjacent interconnectors forms, with the contact layers situated immediately adjacent to the electrolyte/electrode unit on both sides, a high-temperature fuel cell, which also includes those sides of each of the two interconnectors which are situated on the contact layers. This type of fuel cell, and others types, are known from the reference titled "Fuel Cell Handbook" by A. J. Appleby and F. R. Foulkes, 1989, pp. 440–454, for example.

A single high-temperature fuel cell provides an operating voltage of less than one volt. Connecting a large number of adjacent high-temperature fuel cells in series can give an operating voltage of hundreds of volts from a fuel cell system. Since the current provided by a high-temperature fuel cell is high—up to 1,000 amperes in the case of large high-temperature fuel cells—the electrical connection between the individual cells should preferably be one that gives rise to particularly low series electrical resistance under the above-mentioned conditions.

The electrical connection between two high-temperature fuel cells is provided by an interconnector, via which the anode of one high-temperature fuel cell is connected to the cathode of the next high-temperature fuel cell. The interconnector therefore has an electrical connection to the anode of one high-temperature fuel cell and to the cathode of the next high-temperature fuel cell.

The electrical connection between the anode and the interconnector, which is configured as a plate, is provided by an electrical conductor, which may take the form of a nickel grid (see, for example, German Patent DE 196 49 457 C1). It has been found that the series electrical resistance between the anode and the interconnector, when the high-temperature fuel cell is operating, is high. This has a serious adverse effect on the electrical performance of the high-temperature fuel cell stack.

SUMMARY OF THE INVENTION

It is accordingly an object of the invention to provide a high-temperature fuel cell which overcomes the above-mentioned disadvantages of the prior art devices of this general type, which avoids any relatively high series electrical resistance, even when operating under high temperatures, and to ensure high conductivity, even over prolonged periods.

With the foregoing and other objects in view there is provided, in accordance with the invention, a high-temperature fuel cell. The fuel cell contains an electrolyte/electrode unit having an anode, an interconnector having a fuel gas side, and at least two metallic functional layers applied one above another on the fuel-gas side of the interconnector. The two metallic functional layers include a first functional layer containing nickel and a second functional layer containing copper disposed below the first functional layer. An electrical conductor connects the anode to the first functional layer.

According to the invention, the object is achieved by the high-temperature fuel cell of the type with at least two metallic functional layers that are applied one above the other on the fuel-gas side of the interconnector. One of the functional layers contains nickel and the functional layer below it contains copper.

Experiments with the high-temperature fuel cell stack and appropriate modeling experiments have shown that an increase in the electrical resistance between the electrical conductor and the interconnector formed of $CrFe5Y_2O_3 1$ is established, even after a short operating period at operating temperatures of between 850° C. and 950° C. The designation $CrFe5Y_2O_3 1$ represents a chromium alloy that contains 5% by weight of Fe and 1% by weight of $Y_2O_3$. The increase in the electrical resistance is caused by an oxide layer that contains chromium oxide and is formed on the surface of that side of the interconnector that faces the chamber that carries the fuel gas. It also forms where the electrical conductor, for example the nickel grid, rests on the interconnector or, for example, is joined to the interconnector by a spot weld or a soldering point. If the nickel grid has been spot-welded to the interconnector, during operation, amazingly, chromium oxide even creeps beneath these contact points, which are in the form of weld spots. Chromium has a higher electrical resistance than the unoxided metals of the interconnector.

Therefore, there is an oxide layer of poor conductivity between the electrical conductor and the interconnector, which has an unfavorable influence on the series resistance of series-connected high-temperature fuel cells. The formation of chromium oxide takes place even at oxygen partial pressures of less than $10^{-18}$ bar. The oxygen partial pressures are also generally present in the chamber that carries the fuel gas—known as the fuel-gas chamber for short—while the high-temperature fuel cell is operating.

In a first step, the invention is based on the idea that suppressing the formation of the oxide layer on the anode side of the interconnector avoids any relatively high series electrical resistance and ensures high conductivity even over prolonged periods. This is reliably achieved during the operation of the high-temperature fuel cell by the fact that the interconnector is protected from oxidation by a functional layer. Naturally, a functional layer of this type should not be permeable to oxygen under operating conditions. It must not have an adverse effect on the electrical connection between conductor and interconnector. Furthermore, it should be inexpensive and easy to handle.

All these conditions are met by a thin metallic functional layer that closes off the interconnector in a gas-tight manner around the contact point. However, with a functional layer of this type the problem exists that it is oxidized during the initial heating of the high-temperature fuel cell to its operating temperature. During the initial "start-up", there is generally also sufficient air in the fuel-gas chamber of the high-temperature fuel cell to oxidize an inexpensive metallic functional layer. In this case, the oxygen also reaches the interconnector. The oxygen then forms the above-described, disruptive chromium oxide layer on the interconnector.

In a second step, the invention is based on the idea that oxidation of the interconnector can be prevented if the passage of oxygen out of a metallic functional layer into the interconnector is suppressed. This is achieved if a functional layer contains a metal which satisfies the following condition: the oxide formation of a metal of the functional layer is associated with a lower chemical potential $\mu$ than the oxide formation of a metal which is situated directly beneath the functional layer. If an alloy or combination of different metals is situated beneath the functional layer, all these metals must satisfy the above condition.

The term chemical potential $\mu$ is understood as meaning the change in the free enthalpy G of a material system as a result of component B of the system being supplied or removed:

$$\mu_B = \frac{[\partial G]}{[\partial \eta_B]} T, p, n_A, n_C, \ldots$$

In this equation, T is the thermodynamic temperature, p is the pressure, $n_A$, $n_B$, $n_C$ . . . are the quantities of substances A, B, C, . . . . This definition is taken from Römpps Chemielexikon, Franckhsche Verlagsbuchhandlung, 8th edition, Stuttgart 1981.

If the oxide formation of a first metal A is associated with a lower (more negative) chemical potential $\mu_A$ than the oxide formation of a second metal B, therefore the free energy of formation $\Delta G_A$ of the oxide of the first metal A is lower (more negative) than that of the oxide of the second metal B: $\Delta G_A < \Delta G_B$. Accordingly, an oxygen ion in the first metal A is more firmly bonded, i.e. bonded more deeply in terms of energy, than in the second metal B. Therefore, energy is required for the oxygen ion to be transferred from the oxide of the first metal A to the second metal B.

At least two metallic functional layers which are applied one on top of the other on the fuel-gas side of the interconnector, with one functional layer containing nickel and the other functional layer below it containing copper, fulfill the conditions described above, since the combination of materials leads to the high potential threshold as described above between the layers, which greatly impedes the transfer of oxygen ions from the outer nickel layer to the copper layer below it. Furthermore, both metals are inexpensive and are easy to apply to the interconnector.

In this context, it is not absolutely necessary for the two functional layers to be applied directly on top of one another. It is generally also possible for there to be a further functional layer between the nickel-containing functional layer and the copper-containing functional layer. It is also possible for a further functional layer to be present between the interconnector and the two functional layers or above the two functional layers, without the effect of the potential threshold being significantly impaired.

The invention has the result of forming a potential threshold for oxygen ions between the functional layer and the metal below it. Consequently, oxygen in the functional layer does not pass into the metal below it, or does so only to a very limited extent. Consequently, the oxidation of the interconnector during start-up and during operation of the high-temperature fuel cell is suppressed. This prevents a relatively high series electrical resistance of the high-temperature fuel cell and ensures high conductivity even over prolonged periods.

Expediently, the copper-containing functional layer is applied to the interconnector, and the nickel-containing functional layer is applied to the copper-containing functional layer. This configuration can be produced particularly easily and inexpensively.

The nickel-containing functional layer advantageously substantially contains nickel, and the copper-containing functional layer advantageously substantially contains copper. The two metals in their pure form fulfill the conditions needed to effectively protect the interconnector from oxidation.

In an advantageous configuration of the invention, the electrical conductor is directly electrically connected to the interconnector. A direct electrical connection between the electrical conductor and the interconnector is produced by the fact that the electrical conductor is, for example, welded to the interconnector. In this case, the weld extends from the electrical conductor, through both layers, to the interconnector. In the case of an electrical conductor that is connected to the interconnector in this way, the connection is mechanically stable and involves little electrical resistance.

In an alternative configuration of the invention, the electrical conductor is electrically connected to the interconnector via at least one functional layer. An electrical connection of this type between the electrical conductor and the interconnector is achieved by the electrical conductor being joined to the upper functional layer, for example a nickel layer, by a weld, for example. An alternative possibility for producing an electrical connection of this type consists in an electrical conductor that simply rests on or is soldered to the upper functional layer. In this case, all the functional layers must be electrically conductive. This configuration of the invention is particularly simple to implement.

The thickness of the uppermost functional layer is expediently from 2 $\mu$m to 10 $\mu$m. A functional layer of this type is very thin yet is nevertheless suitable for constructing a potential threshold between it and the metal below and effectively preventing the oxygen ions from passing into the interconnector.

The thickness of the lower functional layer is expediently from 2 $\mu$m to 10 $\mu$m. A layer of this thickness is very thin yet is nevertheless suitable for constructing a potential threshold between it and the functional layer and effectively preventing the oxygen ions from passing into the interconnector.

Advantageously, at least one of the two functional layers is applied chemically, by electro-deposition, by a PVD process or by a CVD process. These processes are inexpensive and easy to carry out. These processes allow the interconnector to be coated on one side. The fuel-gas side of the interconnector should be covered over the entire surface in the region around a contact point. When coating by a physical vapor deposition (PVD) process, the material of the layer in question is applied from the vapor phase. This is achieved, for example, by sputtering, electron-beam vaporization or laser-beam vaporization. The coating temperature is less than 500° C.

An alternative to the PVD process is a chemical vapor deposition (CVD) process. In the thermal coating process, the substance which is to form the coating is chemically generated in the vapor phase by a decomposition of starting materials and applied to the component which is to be coated.

In a further advantageous configuration of the invention, the interconnector is formed of $CrFe5Y_2O_31$, i.e. contains 94% by weight of chromium, 5% by weight of Fe and 1% by weight of $Y_2O_3$. In numerous tests, an interconnector of this type has proven suitable for operation in a high-temperature fuel cell. Furthermore, it can be coated with a metallic functional layer without problems.

In a further advantageous configuration of the invention, the electrical conductor is a nickel grid. The nickel grid may also be configured as a nickel grid assembly that contains a thinner contact grid and a thicker support grid. The electrical contact between the nickel grid (or nickel grid assembly) and the interconnector is produced by a contact point. The contact point may be in the form, for example, of a weld spot that also mechanically joins the nickel grid (or, for example, the support grid of a nickel grid assembly) to the interconnector. However, the contact point can also be produced simply by the nickel grid resting on the interconnector. Nickel is particularly appropriate, since it is not oxidized at the oxygen partial pressures of approximately $10^{-18}$ bar which usually prevail on the fuel-gas side while the high-temperature fuel cell is operating. Furthermore, nickel is inexpensive and easy to handle. A grid produced from nickel is elastic and ensures sufficient electrical contact between interconnector and nickel grid even when it simply rests on the interconnector. This contact is retained even in the event of temperature fluctuations within the high-temperature fuel cell.

Other features which are considered as characteristic for the invention are set forth in the appended claims.

Although the invention is illustrated and described herein as embodied in a high-temperature fuel cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
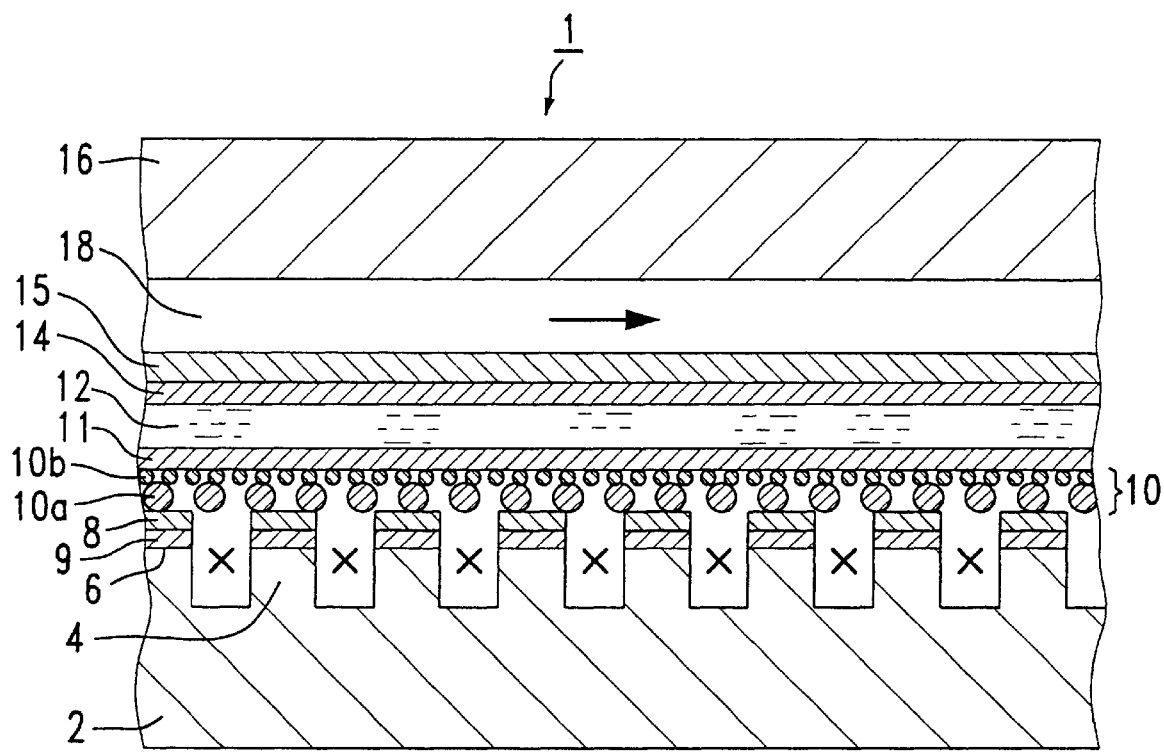
FIG. 1 is a diagrammatic, sectional view of a part of a high-temperature fuel cell.

Referring now to the figures of the drawing in detail and first, particularly, to FIG. 1 thereof, there is shown an interconnector 2 which is configured as a plate and is formed of $CrFe5Y_2O_31$. The interconnector 2 is provided with a number of webs 4, between which have been formed channels running perpendicularly to the plane of the paper for an operating media. The channels are supplied with a fuel gas, such as hydrogen, natural gas or methane. A lower part of a high-temperature fuel cell 1 represents an anode side. A surface 6 of the interconnector 2 is provided with a thin functional layer 9, which substantially contains copper. A thickness of the functional layer 9 is approximately 5 µm. An approximately 5 µm-thick functional layer 8, which substantially contains nickel, is applied to the functional layer 9. An electrical conductor 10 is attached to the functional layer 8 by spot welding. The electrical conductor 10 is in the form of a nickel grid. The weld spots form the contact points which electrically connect the electrical conductor 10 to the interconnector 2. They are not shown for the sake of clarity. The nickel grid is in this case a nickel grid assembly, containing a coarse, relatively thick nickel support grid 10a and a fine, relatively thin nickel contact grid 10b. A solid electrolyte 12 adjoins the nickel grid via a thin anode 11. The solid electrolyte 12 is delimited at the top by a cathode 14. The cathode 14 is adjoined, via a contact layer 15, by a further interconnector 16, only part of which is shown at the top. A number of channels 18 for the operating media, only one of which is shown, are machined into the interconnector 16. The channels 18 for the operating media run parallel to the plane of the paper. In operation, they carry oxygen or air.

A unit containing the cathode 14, the solid electrolyte 12 and the anode 11 is referred to as electrolyte-electrode unit.

The functional layer 8 of nickel that is shown in the FIG. 1, together with the functional layer 9 of copper below it, forms a potential threshold between the layers. This prevents oxygen ions from passing from the functional layer 8 into the functional layer 9 to such an extent that substantially no oxygen ions pass from the functional layer 8 into the functional layer 9. Consequently, the formation of chromium oxide between the interconnector 2 and the nickel grid is prevented. In particular, corrosion below the weld spots is suppressed. This ensures a uniformly good electrical conductivity of the contacts. The high-temperature fuel cell 1 therefore has a low series resistance that does not rise or only rises to an insignificant extent during operation.

A plurality of fuel cells of this type can be combined to form a fuel cell stack.

Figure 2:
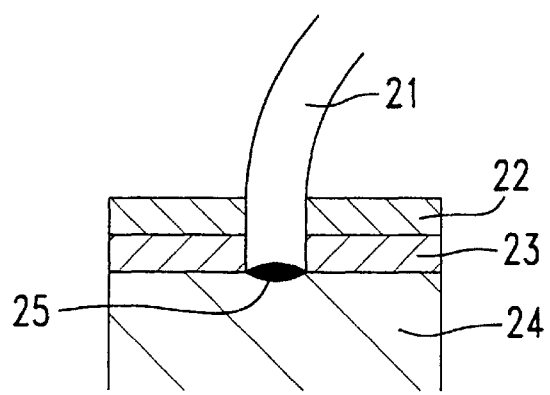
FIG. 2 is a sectional view of a conductor which is connected to an interconnector.

FIG. 2 shows an electrical conductor 21, that is directly electrically connected, through two functional layers 22, 23, to an interconnector 24 of a high-temperature fuel cell. The conductor 21 was connected to the interconnector 24 by being welded to the interconnector 24 through the functional layers 22, 23 by a weld spot 25.

We claim:

1. A high-temperature fuel cell, comprising:
   an electrolyte/electrode unit having an anode;
   an interconnector having a fuel gas side;
   at least two metallic functional layers applied one above another on said fuel-gas side of said interconnector, said two metallic functional layers including a first functional layer containing nickel and a second functional layer containing copper disposed below said first functional layer; and
   an electrical conductor connecting said anode to said first functional layer.

2. The high-temperature fuel cell according to claim 1, wherein said second functional layer is applied to said interconnector, and said first functional layer is applied to said second functional layer.

3. The high-temperature fuel cell according to claim 1, wherein said first functional layer substantially contains nickel, and said second functional layer substantially contains copper.

4. The high-temperature fuel cell according to claim 1, wherein said electrical conductor is directly electrically connected to said interconnector.

5. The high-temperature fuel cell according to claim 1, wherein said electrical conductor is electrically connected to said interconnector through at least one of said two metallic functional layers.

6. The high-temperature fuel cell according to claim 1, wherein said first functional layer has a thickness from 2 $\mu$m to 10 $\mu$m.

7. The high-temperature fuel cell according to claim 1, wherein said second functional layer has a thickness from 2 $\mu$m to 10 $\mu$m.

8. The high-temperature fuel cell according to claim 1, wherein at least one of said first functional layer and said second functional layer is applied chemically by a process selected from the group consisting of a electro-deposition process, a physical vapor deposition process and a chemical vapor deposition process.

9. The high-temperature fuel cell according to claim 1, wherein said interconnector is formed of $CrFe5Y_2O_31$.

10. The high-temperature fuel cell according to claim 1, wherein said electrical conductor is a nickel grid.

* * * * *